(12) United States Patent
Croak et al.

(10) Patent No.: US 7,715,548 B2
(45) Date of Patent: May 11, 2010

(54) METHOD AND APPARATUS FOR INTEGRATING CUSTOMER CARE INQUIRIES ACROSS DIFFERENT MEDIA TYPES

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 997 days.

(21) Appl. No.: 11/211,511

(22) Filed: Aug. 25, 2005

(65) Prior Publication Data

US 2007/0047528 A1    Mar. 1, 2007

(51) Int. Cl.
*H04M 3/00* (2006.01)
(52) U.S. Cl. .............................. 379/266.02; 379/265.05
(58) Field of Classification Search .................
379/265.01–265.14, 266.01–266.1, 309
See application file for complete search history.

(56) References Cited

U.S. PATENT DOCUMENTS

2002/0194047 A1    12/2002    Edinger et al.

FOREIGN PATENT DOCUMENTS

| WO | WO 99/04347 | 1/1999 |
| WO | WO 01/50336 | 7/2001 |
| WO | WO 2004/034188 | 4/2004 |

OTHER PUBLICATIONS

EPO Search Report dated Nov. 8, 2006, of corresponding European Patent application No. EP 06 11 9494, 2 pages.

*Primary Examiner*—William J Deane

(57) ABSTRACT

A method and apparatus for integrating queries across different media types so that the response time performance of a customer care agent, such as time to respond and/or time to repair can be uniformly measured are disclosed. The present method can provide configurable time to respond and time to repair targets on a per media type basis or on a per queue basis across all different media types. Individual media type and/or queue thresholds can be set and alarms and notifications can be triggered when customer care agents exceed these thresholds.

18 Claims, 4 Drawing Sheets

METHOD AND APPARATUS FOR INTEGRATING CUSTOMER CARE INQUIRIES ACROSS DIFFERENT MEDIA TYPES

The present invention relates generally to communication networks and, more particularly, to a method and apparatus for integrating customer care inquiries into a single queue across media types in communication networks, e.g. packet networks such as Voice over Internet Protocol (VoIP) networks.

BACKGROUND OF THE INVENTION

Customer care agents may receive input from clients via voice calls, emails, voice mails, and instant messages. Independent of the medium that the clients use to communicate with the customer care agents, the agents must respond to the customers in the shortest amount of time possible. In order to guarantee and track customer inquiry response quality and performance, the customer inquiry response performance of customer care agents must be tracked. There needs to be a consistent way to measure customer care agent response performance across different media types.

Therefore, a need exists for a method and apparatus for integrating customer care inquiries across different media types in a packet network, e.g., a VoIP network.

SUMMARY OF THE INVENTION

In one embodiment, the present invention enables queries across multiple media types to be integrated into a single queue and time stamped in a consistent way so that the response time performance of a customer care agent, such as time to respond and time to repair can be uniformly measured. In one embodiment, the mean time to respond is defined to be the time interval between when a customer inquiry arrives and when the inquiry is actually read and acknowledged by a customer care agent. In one embodiment, the mean time to repair is defined to be the time interval between when a customer inquiry is read and acknowledged by a customer care agent and when the inquiry is actually resolved by a customer care agent. This invention can provide configurable time to respond and time to repair targets on a per media type basis or on a single queue basis across all media types. Individual media type and queue thresholds can be set and alarms and notifications can be triggered when customer care agents exceed these thresholds.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
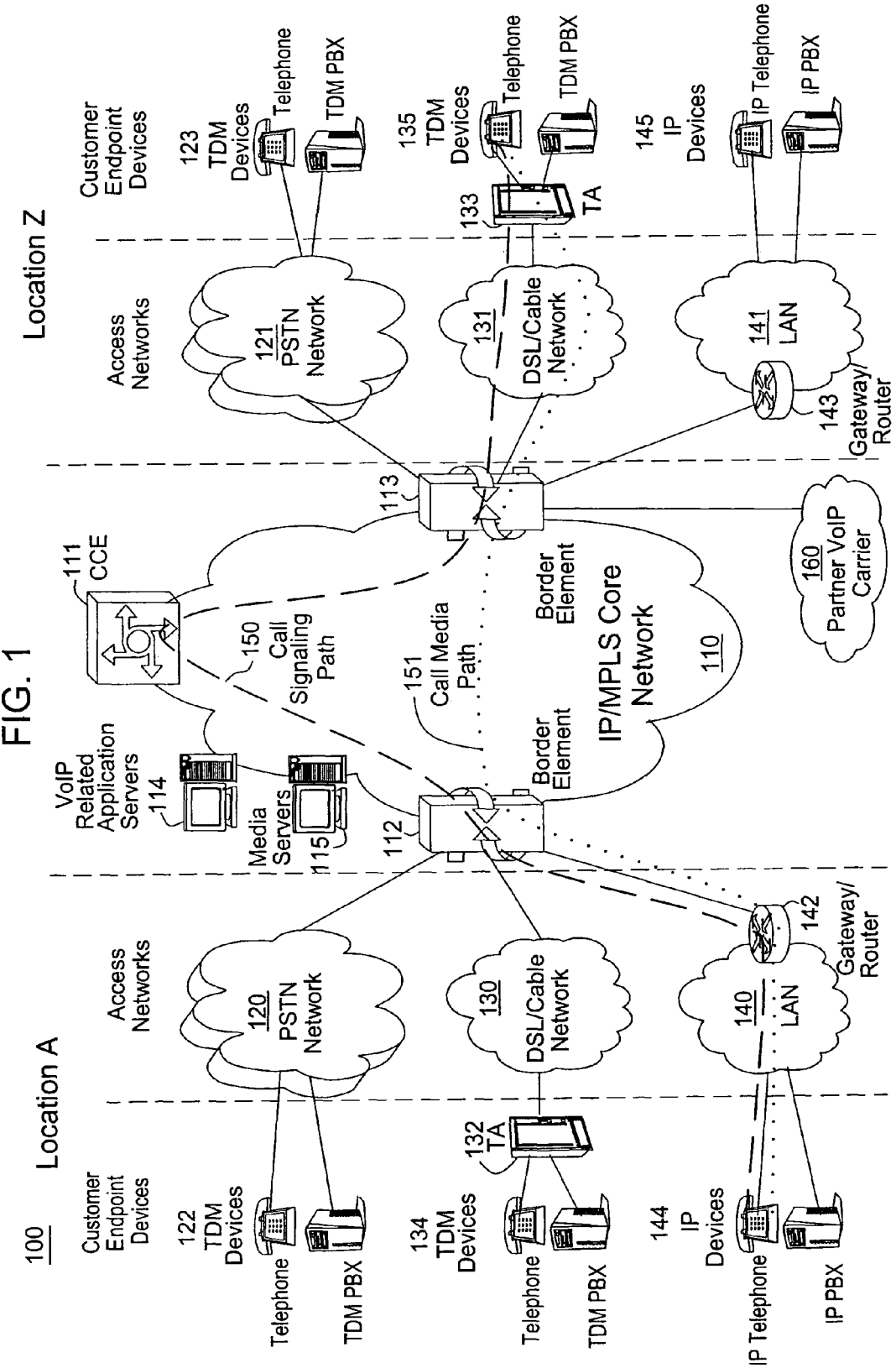
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Customer care agents may receive input from clients via voice calls, emails, voice mails, and instant messages. Independent of the medium that the clients use to communicate with customer care agents, agents must respond to customers in the shortest amount of time possible. In order to guarantee and track customer inquiry response quality and performance, the customer inquiry response performance of customer care agents must be tracked. There needs to be a consistent way to measure customer care agent response performance across different media types, e.g., on a per queue basis. In one embodiment, a queue is a set of consolidated customer inquires comprising multiple media types.

To address this need, in one embodiment, the present invention enables queries across multiple media types to be integrated into a single queue and time stamped in a consistent way so that the response time performance of a customer care agent, such as time to respond and time to repair can be uniformly measured. For example, the mean time to respond is defined to be the time interval between when a customer inquiry arrives and when the inquiry is actually read and acknowledged by a customer care agent. In another example, the mean time to repair is defined to be the time interval between when a customer inquiry is read and acknowledged by a customer care agent and when the inquiry is actually resolved by a customer care agent. The present invention can provide configurable time to respond and time to repair targets on a per media type basis or on a single queue basis across all media types. Individual media type and queue thresholds can be set and alarms and notifications can be triggered when customer care agents exceed these thresholds.

Figure 2:
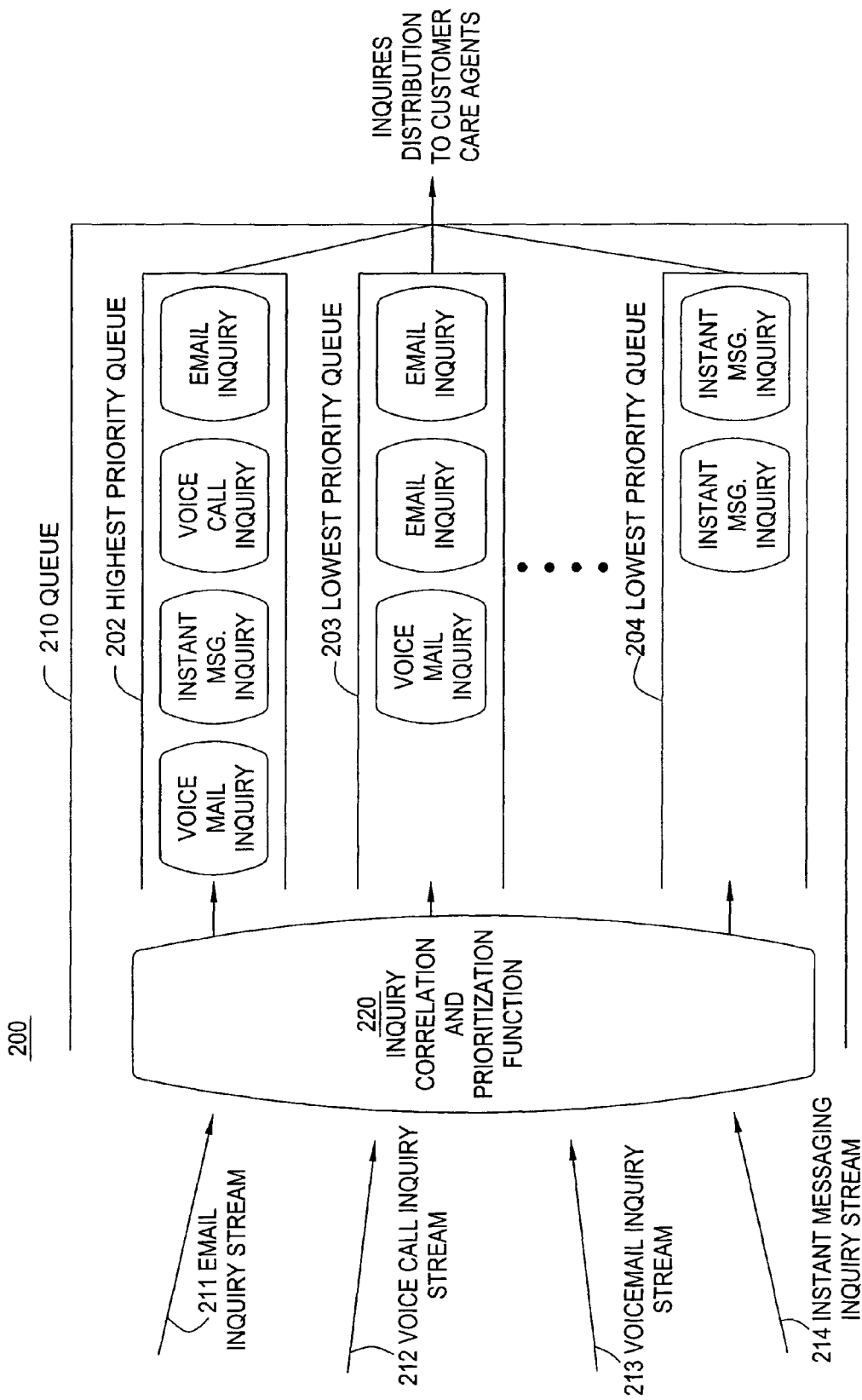
FIG. 2 illustrates an example of integrating customer care inquiries into a single queue across media types in a VoIP network related to the present invention.

FIG. 2 illustrates an example 200 of integrating customer care inquiries into a single queue across media types in a packet network, e.g., a VoIP network related to the present invention. In FIG. 2, customers inquires are arriving at the customer care center via multiple media types including, email inquiry stream 211, voice call inquiry stream 212, voicemail inquiry stream 213, and instant message inquiry stream 214. Each inquiry within these inquiry streams is time stamped, correlated and prioritized by inquiry correlation and prioritization function 220 into a queue 210. Although only one queue is shown FIG. 2, the present invention can be implemented with more than one queue. Within queue 210, customer inquiries are further separated into different priority queues based on the urgency and the degree of service impact of a particular customer inquiry. For instance, an inquiry related to a general question regarding VoIP services may be considered the lowest priority while an inquiry related to a down phone line may be considered the highest priority. The number of levels of priority is a configurable parameter set by the network operator. In FIG. 2, queue 210 comprises a number of priority queues ranging from a highest priority queue 202, a lower or second priority queue 203, to the lowest priority queue 204. Each priority queue may comprise a number of customer inquiries with multiple media types, such as email, voice call, voicemail, and instant message inquires. Customer inquiries are responded based on the priority of the customer inquiries. For instance, an available customer care agent will respond to an inquiry in the highest priority queue 202 first. When inquiries in highest priority queue 202 are all distributed, then an available customer care agent will respond to inquires in lower priority queue 203. For inquires within the same priority level, an inquiry is responded to based on the arrival time of the inquiry using the arrival time stamp information.

For each media type, the mean time to respond and the mean time to repair performance are tracked continuously. Furthermore, the mean time to respond and the mean time to repair performance are also tracked on a queue basis across multiple media types. When the mean time to respond and/or the mean time to repair performance target are exceeded for a particular media type, an alarm indicating that the mean time to respond or the mean time to repair performance target for that particular media type is exceeded will be sent to the network operator. Similarly, when mean time to respond and/or the mean time to repair performance target are exceeded for the queue, an alarm indicating that the mean time to respond or the mean time to repair performance target for the queue is exceeded will be sent to the network operator. The network operator can then take the appropriate corrective actions when a response time performance alarm is received. The mean time to respond and the mean time to repair performance targets on a per media type basis and on a per queue basis are configurable parameters that can be set by the network operator.

Figure 3:
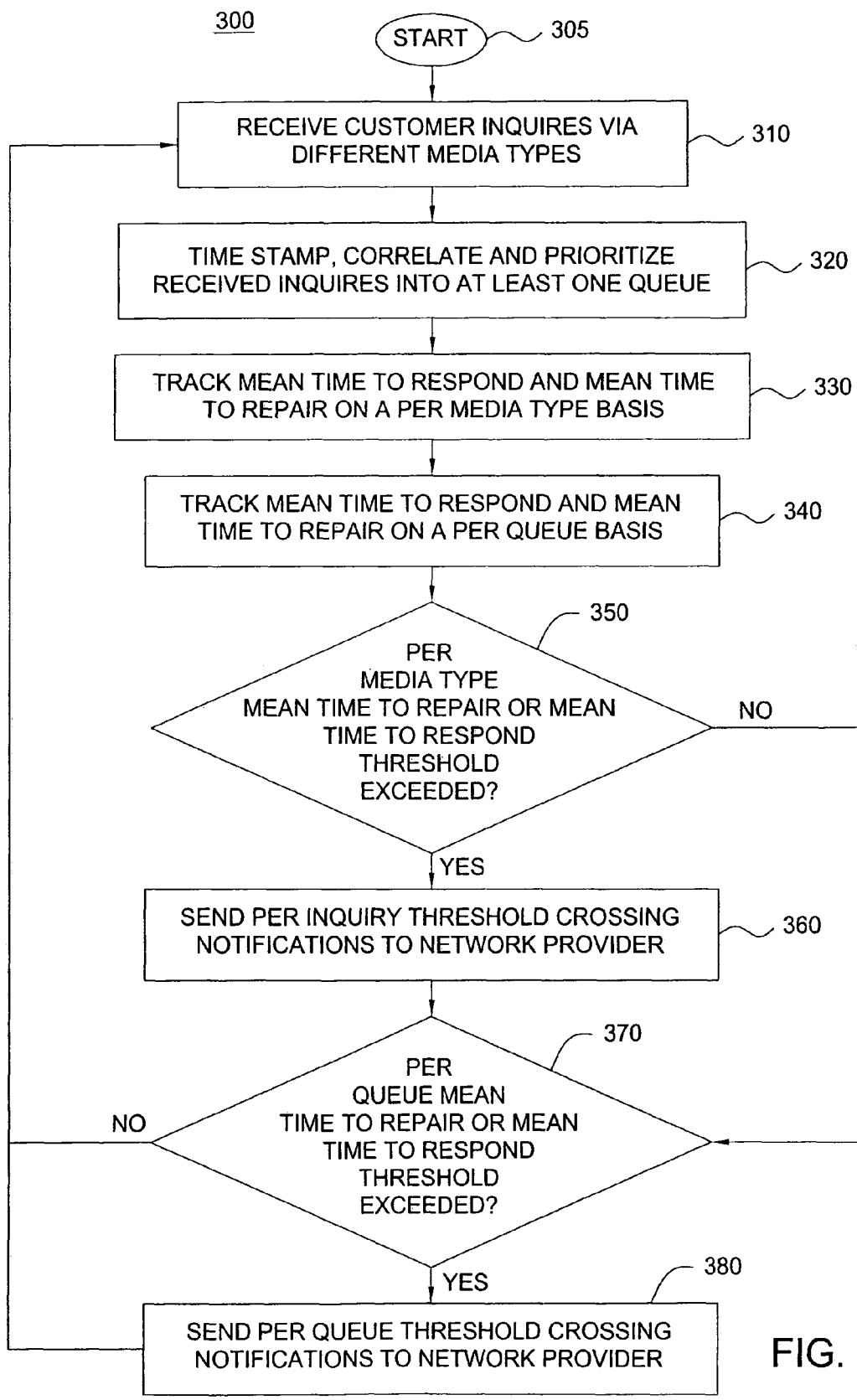
FIG. 3 illustrates a flowchart of a method for integrating customer care inquiries into a single queue across media types in a VoIP network of the present invention.

FIG. 3 illustrates a flowchart of a method 300 for integrating customer care inquiries across media types in a packet network, e.g., a VoIP network of the present invention. Method 300 starts in step 305 and proceeds to step 310.

In step 310, the method receives customer inquires via multiple media streams, such as emails, voice calls, voicemails, and instant messages and the like. In step 320, the method time stamps, correlates and prioritizes the received inquires into a queue. Inquires with higher urgency (an urgency parameter) and/or service impact (a service impact parameter) are assigned and placed into a higher priority queue than inquires with lower urgency and service impact. In step 330, the method tracks a response time performance. For example, the method tracks the mean time to respond and the mean time to repair performance for inquires on a per media type basis. In step 340, the method may track the mean time to respond and the mean time to repair performance for inquires on a per queue basis. In step 350, the method checks if the per media type mean time to respond or mean time to repair performance targets exceeds the predefined thresholds set by the network operator. If the per media type mean time to respond or mean time to repair performance target is exceeded, the method proceeds to step 360; otherwise, the method proceeds to step 370. In step 360, the method sends an alarm to the network indicating that the per media type mean time to respond or mean time to repair performance target is exceeded for a particular media type. In step 370, the method checks if the queue mean time to respond or mean time to repair performance target exceeds the predefined thresholds set by the network operator. If the queue mean time to respond or mean time to repair performance target is exceeded, the method proceeds to step 380; otherwise, the method proceeds back to step 310. In step 380, the method sends an alarm to the network indicating that the queue mean time to respond or mean time to repair performance target is exceeded. The method then proceeds back to step 310.

Figure 4:
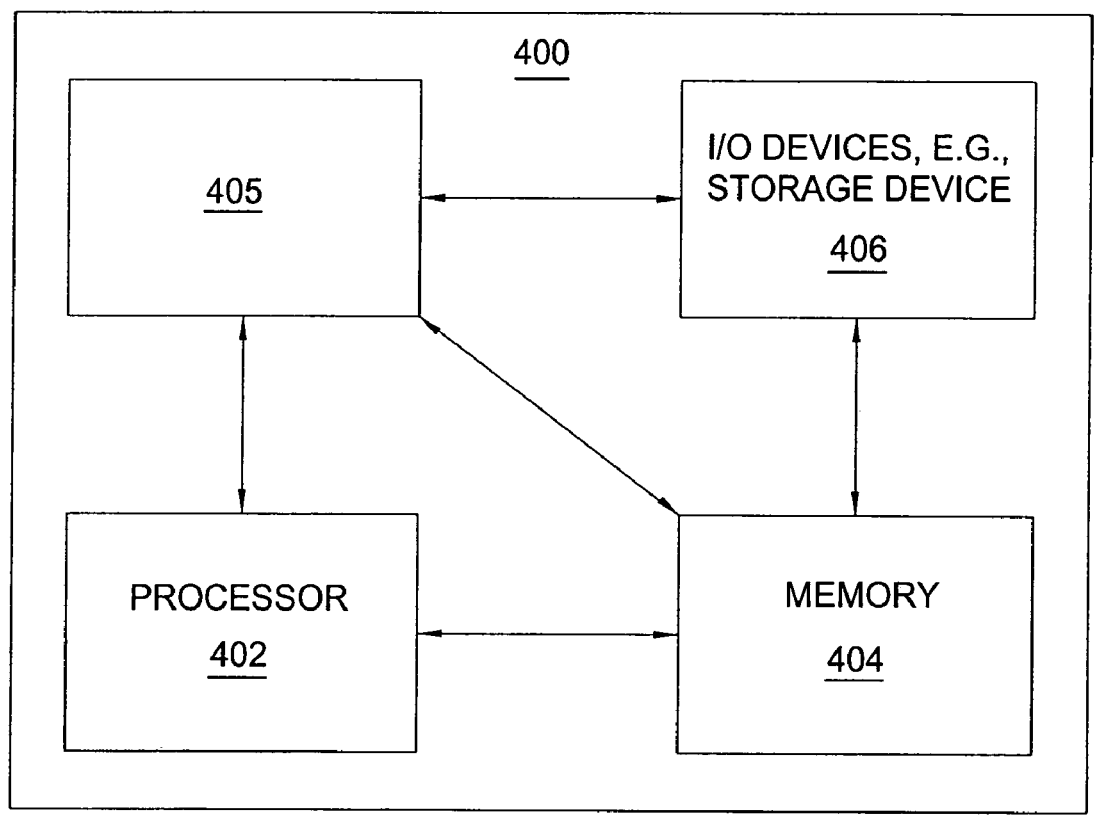
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a customer care inquires processing module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present customer care inquires processing module or process 405 can be loaded into memory 404 and executed by processor 402 to implement the functions as discussed above. As such, the present customer care inquires processing process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for handling a plurality of customer inquiries in a plurality of different media types in a communication network, comprising:
   receiving said plurality of customer inquiries in said plurality of different media types, wherein said receiving comprises prioritizing each of said customer inquiries based on a service impact parameter into one of a plurality of priority queues within at least one queue;
   tracking a response time performance for said plurality of customer inquiries in said at least one queue; and
   sending an alarm to a network operator if said response time performance exceeds a predefined threshold on a per media type basis.

2. The method of claim 1, wherein said communication network is a Voice over Internet Protocol (VoIP) network or a Service over Internet Protocol (SoIP) network.

3. The method of claim 1, wherein said different media types comprise at least two of: an email, a voicemail, an instant messages, or a voice call.

4. The method of claim 1, wherein said receiving further comprises:
   time stamping an arrival of each of said plurality of customer inquiries.

5. The method of claim 4, wherein said prioritizing comprises:
   ordering each of said customer inquiries into one of said plurality of priority queues in accordance with an arrival time stamp associated with each of said customer inquiries.

6. The method of claim 4, wherein each of said priority queues within said at least one queue carries a subset of said plurality of customer inquiries of said different media types.

7. The method of claim 1, wherein said tracking comprises:
   tracking a mean time to respond or a mean time to repair of said plurality of customer inquiries on a per media type basis.

8. The method of claim 1, wherein said tracking comprises:
   tracking a mean time to respond or a mean time to repair of said plurality of customer inquiries on a per queue basis.

9. A computer-readable medium having stored thereon a plurality of instructions, the plurality of instructions including instructions which, when executed by a processor, cause the processor to perform the steps of a method for handling a plurality of customer inquiries in a plurality of different media types in a communication network, comprising:

receiving said plurality of customer inquiries in said plurality of different media types, wherein said receiving comprises prioritizing each of said customer inquiries based on a service impact parameter into one of a plurality of priority queues within at least one queue;

tracking a response time performance for said plurality of customer inquiries in said at least one queue; and sending an alarm to a network operator if said response time performance exceeds a predefined threshold on a per media type basis.

10. The computer-readable medium of claim 9, wherein said communication network is a Voice over Internet Protocol (VoIP) network or a Service over Internet Protocol (SoIP) network.

11. The computer-readable medium of claim 9, wherein said different media types comprise at least two of: an email, a voicemail, an instant messages, or a voice call.

12. The computer-readable medium of claim 9, wherein said receiving further comprises:

time stamping an arrival of each of said plurality of customer inquiries.

13. The computer-readable medium of claim 12, wherein said prioritizing comprises:

ordering each of said customer inquiries into one of said plurality of priority queues in accordance with an arrival time stamp associated with each of said customer inquiries.

14. The computer-readable medium of claim 12, wherein each of said priority queues within said at least one queue carries a subset of said plurality of customer inquiries of said different media types.

15. The computer-readable medium of claim 9, wherein said tracking comprises:

tracking a mean time to respond or a mean time to repair of said plurality of customer inquiries on a per media type basis.

16. The computer-readable medium of claim 9, wherein said tracking comprises:

tracking a mean time to respond or a mean time to repair of said plurality of customer inquiries on a per queue basis.

17. An apparatus for handling a plurality of customer inquiries in a plurality of different media types in a communication network, comprising:

means for receiving said plurality of customer inquiries in said plurality of different media types, wherein said receiving comprises prioritizing each of said customer inquiries based on a service impact parameter into one of a plurality of priority queues within at least one queue;

means for tracking a response time performance for said plurality of customer inquiries in said at least one queue; and means for sending an alarm to a network operator if said response time performance exceeds a predefined threshold on a per media type basis.

18. The apparatus of claim 17, wherein said different media types comprise at least two of: an email, a voicemail, an instant messages, or a voice call.

* * * * *